(12) United States Patent
Nakayama et al.

(10) Patent No.: US 8,716,966 B2
(45) Date of Patent: May 6, 2014

(54) ROTARY ELECTRIC MACHINE FOR VEHICLES

(75) Inventors: Hideaki Nakayama, Tokoname (JP); Harumi Horihata, Nagoya (JP)

(73) Assignee: Denso Corporation, Kariya (JP)

(*) Notice: Subject to any disclaimer, the term of this patent is extended or adjusted under 35 U.S.C. 154(b) by 24 days.

(21) Appl. No.: 13/269,168

(22) Filed: Oct. 7, 2011

(65) Prior Publication Data
US 2012/0086371 A1 Apr. 12, 2012

(30) Foreign Application Priority Data
Oct. 8, 2010 (JP) ................................ 2010-228867

(51) Int. Cl.
*H02P 6/18* (2006.01)

(52) U.S. Cl.
USPC ........... 318/400.06; 290/40 E; 290/5; 290/12; 290/23; 290/36 R

(58) Field of Classification Search
USPC ............ 318/665, 41, 754, 799, 607, 78, 147, 318/713, 723, 807, 827, 503, 400.42; 290/40 E, 5, 12, 21, 23, 27, 29, 36 R, 290/40 A–40 F, 49; 363/127
See application file for complete search history.

(56) References Cited

U.S. PATENT DOCUMENTS

| | | | |
|---|---|---|---|
| 5,492,273 A * | 2/1996 | Shah .......................... | 236/44 A |
| 6,850,031 B2 * | 2/2005 | Nakata et al. ................. | 318/801 |
| 7,075,271 B2 * | 7/2006 | Urakabe et al. ................. | 322/24 |
| 7,508,087 B2 * | 3/2009 | Tsujimoto et al. .......... | 290/40 C |
| 7,847,498 B2 * | 12/2010 | Shibuya ................... | 318/400.01 |
| 7,859,207 B2 * | 12/2010 | Yamada et al. .......... | 318/400.02 |
| 7,915,867 B1 * | 3/2011 | Bulthaup et al. ................ | 322/18 |
| 8,049,458 B2 * | 11/2011 | Seguchi ........................ | 318/700 |
| 2007/0200346 A1 * | 8/2007 | Kanazawa et al. .......... | 290/40 B |
| 2008/0225565 A1 | 9/2008 | Tsujimoto et al. | |
| 2010/0133961 A1 * | 6/2010 | Shirakata et al. ........... | 310/68 B |
| 2011/0025242 A1 * | 2/2011 | Maeda et al. ............ | 318/400.04 |
| 2011/0309776 A1 * | 12/2011 | Miyamoto .................... | 318/139 |
| 2012/0007568 A1 * | 1/2012 | Horihata et al. ................ | 322/21 |

FOREIGN PATENT DOCUMENTS

| | | |
|---|---|---|
| FR | 2913830 A1 * | 9/2008 |
| JP | B2-4023353 | 12/2007 |
| JP | B2-4275704 | 6/2009 |

\* cited by examiner

*Primary Examiner* — Eduardo Colon Santana
*Assistant Examiner* — Said Bouziane
(74) *Attorney, Agent, or Firm* — Oliff PLC

(57) ABSTRACT

In a vehicular rotary electric machine, a switching section includes a bridge circuit having plurality of upper arms and plurality of lower arms. The arms include switching elements. A diode is connected in parallel to each switching element. One end of the switching element of each of the upper arms is connected to a positive terminal of a battery and one end of the switching element of each of the lower arms is connected to a negative terminal of the battery via a vehicle body. The switching section rectifies induced phase voltage of an armature winding. A section sets ON-timing of the switching elements. A section sets OFF-timing of the switching elements. When the switching element of each lower arm is OFF, a detector detects an energization period in which current flows to the diode. A calculator calculates a rotation frequency based on the detected energization period.

10 Claims, 11 Drawing Sheets

ROTARY ELECTRIC MACHINE FOR VEHICLES

CROSS-REFERENCE TO RELATED APPLICATION

This application is based on and claims the benefit of priority from earlier Japanese Patent Application No. 2010-228867 filed Oct. 8, 2010 the description of which is incorporated herein by reference.

BACKGROUND OF THE INVENTION

1. Field of the Invention

The present invention relates to a rotary electric machine for a vehicle mounted in a car, a truck, and the like.

2. Description of the Related Art

An rotary electric machine for a vehicle is known, in which the output voltage of an armature winding is rectified using an inverter circuit having a plurality of switching elements (refer to, for example, Japanese Patent No. 4023353. In the rotary electric machine for a vehicle, the timing at which the switching element of a certain phase is turned OFF is set to a point at which a delay time based on rotation frequency has elapsed from a point at which the phase voltage of another phase has reached a predetermined threshold value. The rotation frequency used in control such as that described above is detected based on the amount of time between points at which the alternating-side main electrode voltages of the upper arm elements of two adjacent phases exceed a predetermined threshold value (the time difference between points at which the voltages of two phase windings exceed a predetermined threshold value).

In a vehicle power generator disclosed in Japanese Patent No. 4023353, when power generation voltage changes in accompaniment with fluctuations in electrical load and the like, the point at which the phase voltage exceeds the predetermined threshold value shifts. Therefore, a problem occurs in that the accuracy of rotation frequency detection decreases with the change in power generation voltage. For example, the power generation voltage increases when the electrical load is suddenly reduced. Therefore, the point at which the phase voltage exceeds the predetermined threshold value becomes slightly earlier. Thus, the amount of time between the two points at which rotation frequency detection is performed becomes shorter compared to when the power generation voltage is constant. A judgment that the rotation frequency has increased is erroneously made.

SUMMARY

Hence it is desired to provide an rotary electric machine for a vehicle capable of improving accuracy of rotation frequency calculation.

An exemplary embodiment provides an rotary electric machine for a vehicle is disclosed, including: an armature winding having phase windings of two phases or more; a switching section that configures a bridge circuit having a plurality of upper arms and lower arms configured by switching elements to which a diode is connected in parallel, in which one end of the switching element of the upper arm is connected to a positive terminal side of a battery and one end of the switching element of the lower arm is connected to a negative terminal side of the battery via a vehicle body, and that rectifies an induced phase voltage of the armature winding; an ON-timing setting section that sets an ON-timing of the switching elements; an OFF-timing setting section that sets an OFF-timing of the switching elements; an energization period detector that detects an energization period in which current flows to the diode connected in parallel to the switching element, when the switching element of each of the lower arms is OFF, the energization period being a period from a time when the phase voltage reaches, from a first threshold value, a second threshold; and a rotation frequency calculator that calculates rotation frequency based on the energization period detected by the energization period detector.

One end side of the switching element of the lower arm is connected (grounded) to the vehicle body. Therefore, even when sudden fluctuations in electrical load occur, the fluctuations in the power generation voltage (phase voltage) are small. Accuracy of rotation frequency calculation can be improved through use of the energization period detected based on the power generation voltage.

In addition, the above-described rotation frequency calculator preferably calculates the rotation frequency based on at least one of the cycle of a start timing and the cycle of an end timing of the energization period. In general, the start timing and the end timing of the energization period are required for the various processes required to be performed in synchronization control. Therefore, processes and configurations can be simplified by the timings also being used for rotation frequency calculation.

In addition, the above-described ON-timing setting section preferably sets the point at which the phase voltage reaches the first threshold value as the ON-timing of the switching element of the lower arm. As a result of the first threshold value used to set the ON-timing of the switching element of the lower arm also being used for rotation frequency calculation, a comparison operation of the phase voltage and the first threshold value can be shared. Processes and configurations can be simplified.

In addition, the above-described OFF-timing setting section preferably sets the OFF-timings of the respective switching elements of the upper arm and the lower arm based on the rotation frequency calculated by the rotation frequency calculator. As a result, synchronization control for turning ON/OFF the switching elements can be performed with a simple configuration, without use of a separate component, such as a sensor, for detecting the rotation frequency.

In addition, the above-described rotation frequency calculator preferably calculates a first rotation frequency based on the cycle of the start timing of the energization period, and calculates a second rotation frequency based on the cycle of the end timing of the energization period. The OFF-timing setting section preferably sets the OFF-timing of the switching element of the lower arm based on the first rotation frequency, and sets the OFF-timing of the switching element of the upper arm based on the second rotation frequency. In addition, the above-described OFF-timing setting section preferably sets the OFF-timings of the respective switching elements of the upper arm and the lower arm included in the subsequent cycle of the phase voltage based on the rotation frequency calculated by the rotation frequency calculator. As a result, OFF-control of the switching elements can be performed using the newest rotation frequency.

In addition, the above-described rotation frequency calculator preferably calculates rotation frequency by averaging at least one of the cycle of the start timing of the energization period and the cycle of the end timing taken over a plurality of cycles. As a result, the rotation frequency can be stably set, even when rotational fluctuations occur.

In addition, the above-described rotation frequency calculator preferably determines the rotation frequency by calculating K/C, when the result of the measurement of at least one of the period of the start timing of the energization period and the cycle of the end timing is C, and a coefficient for converting cycle to rotation frequency is K. As a result, the rotation frequency can be determined by a simple calculation using the obtained cycle. Processing load of rotation frequency calculation can be reduced.

DETAILED DESCRIPTION OF THE PREFERRED EMBODIMENTS

Figure 1:
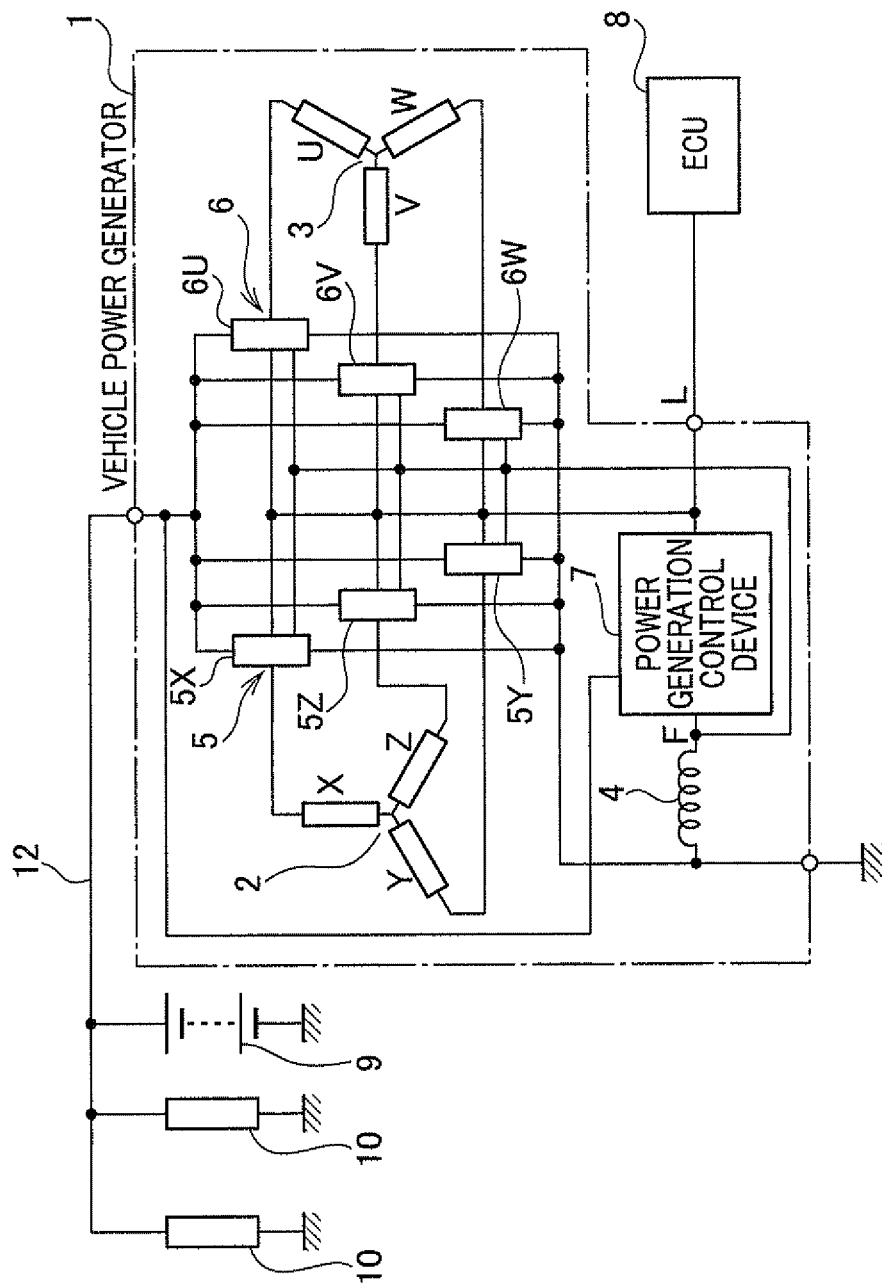
FIG. 1 is a diagram of a configuration of a vehicle power generator according to an embodiment.

A vehicle power generator according to an embodiment to which an rotary electric machine for a vehicle of the present invention is applied will be described with reference to the drawings. FIG. 1 is a diagram of a configuration of a vehicle power generator according to the present embodiment. As shown in FIG. 1, a vehicle power generator 1 according to the present embodiment includes two stator windings (armature windings) 2 and 3, a field winding 4, two rectifier module groups 5 and 6, and a power generation control device 7. The two rectifier module groups 5 and 6 correspond to a switching section.

One stator winding 2 is a multi-phase winding (such as a three-phase winding composed of an X-phase winding, a Y-phase winding, and a Z-phase winding) wound around a stator core (not shown). In a similar manner, the other stator winding 3 is also a multi-phase winding (such as a three-phase winding composed of a U-phase winding, a V-phase winding, and a W-phase winding). The stator winding 3 is wound around the above-described stator core in a position shifted by an electrical angle of 30 degrees from the stator winding 2. According to the present embodiment, a stator is configured by the two stator windings 2 and 3, and the stator core.

The field winding 4 is wound around a field pole (not shown) disposed opposing the inner peripheral side of the stator core and configures a rotor. The field pole becomes magnetized by excitation current being sent to the field winding 4. The stator windings 2 and 3 generate an alternating current as a result of a rotating magnetic field generated when the field pole is magnetized.

One rectifier module group 5 is connected to one stator winding 2 and configures a three-phase full-wave rectification circuit (bridge circuit) as a whole. The rectifier module group 5 converts the alternating current induced in the stator winding 2 to a direct current. The rectifier module group 5 includes a quantity of rectifier modules corresponding with the quantity of phases in the stator winding 2 (three rectifier modules for a three-phase winding). In other words, the rectifier module group 5 includes rectifier modules 5X, 5Y, and 5Z. The rectifier module 5X is connected to the X-phase winding included in the stator winding 2. The rectifier module 5Y is connected to the Y-phase winding included in the stator winding 2. The rectifier module 5Z is connected to the Z-phase winding included in the stator winding 2.

The other rectifier module group 6 is connected to the other stator winding 3 and configures a three-phase full-wave rectification circuit (bridge circuit) as a whole. The rectifier module group 6 converts the alternating current induced in the stator winding 3 to a direct current. The rectifier module group 6 includes a quantity of rectifier modules corresponding with the quantity of phases in the stator winding 3 (three rectifier modules for a three-phase winding). In other words, the rectifier module group 6 includes rectifier modules 6U, 6V, and 6W. The rectifier module 6U is connected to the U-phase winding included in the stator winding 3. The rectifier module 6V is connected to the V-phase winding included in the stator winding 3. The rectifier module 6W is connected to the W-phase winding included in the stator winding 3.

The power generation control device 7 is an excitation control circuit that controls the excitation current sent to the field winding 4 connected by an F terminal. The power generation control device 7 adjusts the excitation current, thereby controlling the output voltage $V_B$ of the vehicle power generator 1 (output voltage of each rectifier module) to become a regulated voltage Vreg. For example, the power generation control device 7 stops the supply of excitation current to the field winding 4 when the output current $V_B$ becomes higher than the regulated voltage Vreg. The power generation control device 7 supplies the excitation current to the field winding 4 when the output voltage $V_B$ becomes lower than the regulated voltage Vreg. As a result, the power generation control device 7 can perform control such that the output voltage $V_B$ becomes the regulated voltage Vreg. In addition, the power generation control device 7 is connected to an electronic control unit (ECU) 8 (external control device) by a communication terminal L and a communication line. The power generation control device 7 performs two-way serial communication (such as Local Interconnect Network [LIN] communication using LIN protocol) with the ECU 8. Communication messages are transmitted and received.

The vehicle power generator 1 according to the present embodiment is configured as described above. Next, details of the rectifier module 5X and the like will be described.

Figure 2:
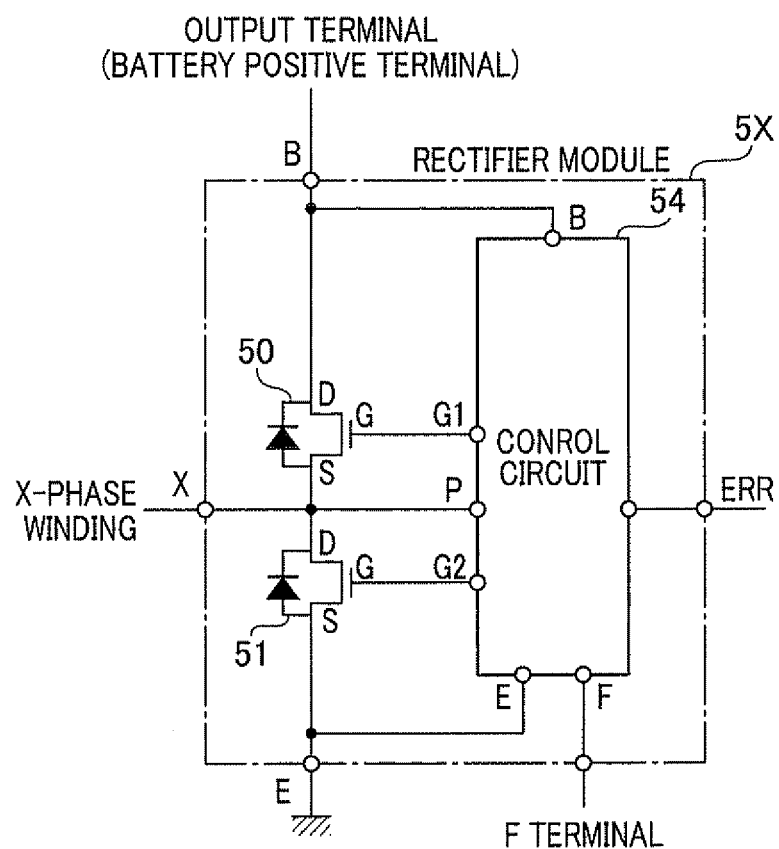
FIG. 2 is a diagram of a configuration of a rectifier module.

FIG. 2 is a diagram of a configuration of the rectifier module 5X. The other rectifier modules 5Y, 5Z, 6U, 6V, and 6W have the same configuration. As shown in FIG. 2, the rectifier module 5X includes two metal-oxide-semiconductor (MOS) transistors 50 and 51, and a control circuit 54. The MOS transistor 50 is an upper arm (high-side) switching element. The source of the MOS transistor 50 is connected to the X-phase winding of the stator winding 2, and the drain is connected to a positive terminal of an electrical load 10 or a battery 9 by a charging line 12. The MOS transistor 51 is a lower arm (low-side) switching element. The drain of the MOS transistor 51 is connected to the X-phase winding, and the source is connected to a negative terminal of the battery 9 (grounding using the vehicle body). A series circuit composed of the two MOS transistors 50 and 51 is disposed between the positive terminal and the negative terminal of the battery 9. The X-phase winding is connected to the connection point of the two MOS transistors 50 and 51. A diode is connected in parallel between the source and drain of each MOS transistor 50 and 51. The diode is actualized by a parasitic diode (body diode) of each MOS transistor 50 and 51. However, a diode that is a separate component may be further connected in parallel. A configuration is also possible in which a switching element other than the MOS transistor is used in at least one of the upper arm and lower arm.

Figure 3:
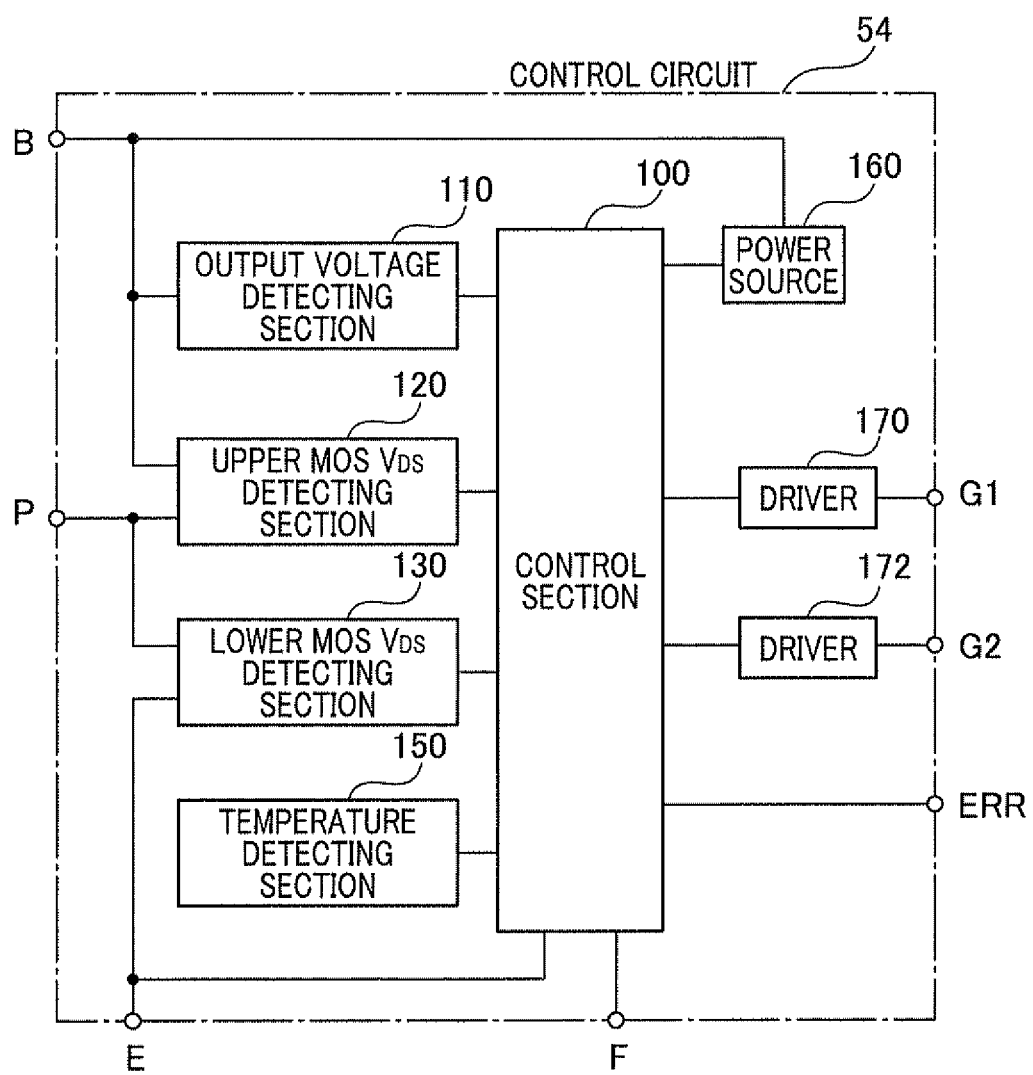
FIG. 3 is a diagram of a detailed configuration of a control circuit.

FIG. 3 is a diagram of a detailed configuration of the control circuit 54. As shown in FIG. 3, the control circuit 54 includes a control section 100, a power source 160, an output voltage detecting section 110, an upper MOS $V_{DS}$ detecting section 120, a lower MOS $V_{DS}$ detecting section 130, a temperature detecting section 150, and drivers 170 and 172.

The power source 160 starts operation at a timing at which the excitation current is supplied to the field winding 4 from the power generation control device 7, and supplies operating voltage to each element included in the control circuit 54. The power source 160 also stops supplying the operating voltage when the supply of excitation current is stopped. The power source 160 is started and stopped in adherence to instructions from the control section 100.

An output terminal (G1) of the driver 170 is connected to the gate of the high-side MOS transistor 50. The driver 170 generates a drive signal for turning ON and OFF the MOS transistor 50. In a similar manner, an output terminal (G2) of the driver 172 is connected to the gate of the low-side MOS transistor 51. The driver 172 generates a drive signal for turning ON and OFF the MOS transistor 51.

The output voltage detecting section 110 is configured by, for example, a differential amplifier and an analog-to-digital converter that converts the output from the differential amplifier to digital data. The output voltage detecting section 110 outputs data corresponding to the voltage of the output terminal (B terminal) of the vehicle power generator 1 (or the rectifier module 5X). The analog-digital converter may be provided on the control section 100 side.

The upper MOS $V_{DS}$ detecting section 120 detects the drain-source voltage $V_{DS}$ of the high-side MOS transistor 50. The upper MOS $V_{DS}$ detecting section 120 then compares the detected drain-source voltage $V_{DS}$ with a predetermined threshold value, and outputs a signal based on whether the detected drain-source voltage $V_{DS}$ is higher or lower than the predetermined threshold value.

Figure 4:
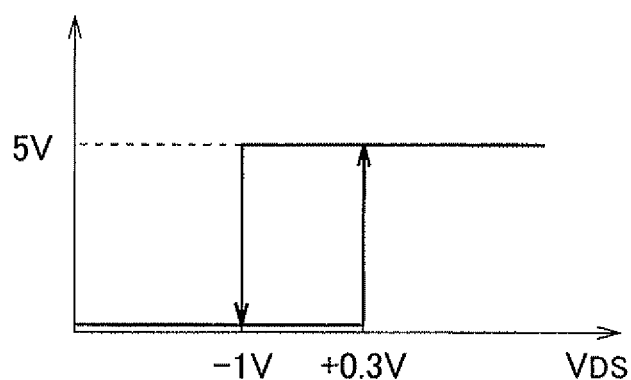
FIG. 4 is a diagram of a specific example of voltage comparison performed by an upper MOS $V_{DS}$ detecting section.

FIG. 4 is a diagram of a specific example of voltage comparison performed by the upper MOS $V_{DS}$ detecting section 120. In FIG. 4, the horizontal axis indicates the drain-source voltage $V_{DS}$ based on the output voltage $V_B$ of the drain side. The vertical axis indicates the voltage level of the signal outputted from the upper MOS $V_{DS}$ detecting section 120. As shown in FIG. 4, when the phase voltage $V_P$ increases and becomes higher than the output voltage $V_B$ by 0.3V or more, the drain-source voltage $V_{DS}$ becomes 0.3V or higher. Therefore, the output signal from the upper MOS $V_{DS}$ detecting section 120 changes from a low voltage level (0V) to a high voltage level (5V). Then, when the phase voltage $V_P$ becomes lower than the output voltage $V_B$ by 1.0V or more, the drain-source voltage $V_{DS}$ becomes −1.0V or less. Therefore, the output signal from the upper MOS $V_{DS}$ detecting section 120 changes from a high voltage level to a low voltage level.

A value V10 (FIG. 7) that is 0.3V higher than the output voltage $V_B$, described above, corresponds with a first threshold value. The first threshold value is used to detect, with certainty, a starting point of a diode energization period. The first threshold value is set to a value higher than a value that is the sum of the output voltage $V_B$ and the drain-source voltage $V_{DS}$ of the MOS transistor 50 when the MOS transistor 50 is turned ON. The first threshold value is also set to a value lower than a value that is the sum of the output voltage $V_B$ and a forward voltage $V_F$ of the diode connected in parallel with the MOS transistor 50. A value V20 (FIG. 7) that is 1.0V lower than the output voltage $V_B$, described above, corresponds with a second threshold value. The second threshold value is used to detect, with certainty, an end point of the diode energization period. The second threshold value is set to a value lower than the output voltage $V_B$. A period from when the phase voltage $V_P$ reaches the first threshold value until the second threshold is reached is an "ON period" of the upper arm. The starting point and the end point of the ON period are shifted from those of the "diode energization period" when the diode is actually energized while the MOS transistor 50 is in the OFF state. According to the present embodiment, synchronization control is performed based on this ON period.

The lower MOS $V_{DS}$ detecting section 130 detects the drain-source voltage $V_{DS}$ of the low-side MOS transistor 51. The lower MOS $V_{DS}$ detecting section 130 then compares the detected drain-source voltage $V_{DS}$ with a predetermined threshold value, and outputs a signal based on whether the detected drain-source voltage $V_{DS}$ is higher or lower than the predetermined threshold value.

Figure 5:
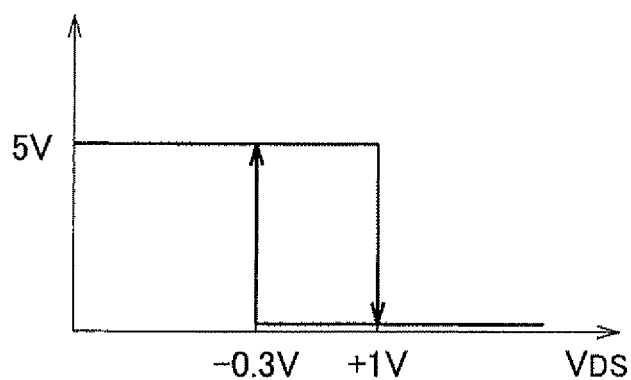
FIG. 5 is a diagram of a specific example of voltage comparison performed by a lower MOS $V_{DS}$ detecting section.

FIG. 5 is a diagram of a specific example of voltage comparison performed by the lower MOS $V_{DS}$ detecting section 130. In FIG. 5, the horizontal axis indicates the drain-source voltage $V_{DS}$ based on a ground terminal voltage $V_{GND}$ that is a battery negative-terminal voltage of the drain side. The vertical axis indicates the voltage level of the signal outputted from the lower MOS $V_{DS}$ detecting section 130. As shown in FIG. 5, when the phase voltage $V_P$ decreases and becomes lower than the ground voltage $V_{GND}$ by 0.3V or more, the drain-source voltage $V_{DS}$ becomes −0.3V or less. Therefore, the output signal from the lower MOS $V_{DS}$ detecting section 130 changes from a low voltage level (0V) to a high voltage level (5V). Then, when the phase voltage $V_P$ becomes higher than the ground voltage $V_{GND}$ by 1.0V or more, the drain-source voltage $V_{DS}$ becomes 1.0V or higher. Therefore, the output signal from the lower MOS $V_{DS}$ detecting section 130 changes from a high voltage level to a low voltage level.

A value V11 (FIG. 7) that is lower than the ground voltage $V_{GND}$ by 0.3V, described above, corresponds with the first threshold value. The first threshold value is used to detect, with certainty, the starting point of the diode energization period. The first threshold value is set to a value lower than a value that is the difference of the ground voltage $V_{GND}$ and the drain-source voltage $V_{DS}$ of the MOS transistor 51 when the MOS transistor 51 is turned ON. The first threshold value is also set to a value higher than a value that is the difference of the ground voltage $V_{GND}$ and the forward voltage $V_F$ of the diode connected in parallel with the MOS transistor 51. A value V21 (FIG. 7) that is 1.0V higher than the output voltage $V_B$, described above, corresponds with the second threshold value. The second threshold value is used to detect, with certainty, the end point of the diode energization period. The second threshold value is set to a value higher than the ground voltage $V_{GND}$. A period from when the phase voltage $V_P$ reaches the first threshold value until the second threshold is reached is an "ON period" of the lower arm. The ON period of the lower arm corresponds with an "energization period" recited in the scope of claims. The starting point and the end point of the ON period are shifted from those of the "diode energization period" when the diode is actually energized while the MOS transistor 51 is in the OFF state. According to the present embodiment, synchronization control is performed based on this ON period. In addition, the first threshold value (V11) and the second threshold value (V21) corresponding with the lower arm, described above, corresponds with a first threshold value and a second threshold value recited in the scope of claims.

The temperature detecting section 150 is configured by, for example, a diode disposed near the MOS transistors 50 and 51 and the control section 100, and an analog-to-digital converter that converts the forward voltage of the diode to digital data. The forward voltage of the diode has temperature dependency. Therefore, the temperature near the MOS transistors 50 and 51 and the like can be detected based on the forward voltage. The analog-to-digital converter or the overall temperature detecting section 150 may be provided within the control section 100.

The control section 100 judges the timing for starting a synchronized rectification operation, sets the ON/OFF-timings of the MOS transistors 50 and 51 for performing synchronized rectification, drives the drivers 170 and 172 in correspondence with the ON/OFF-timing settings, judges load-dump protection operation transition timing, performs a protection operation, and the like.

Figure 6:
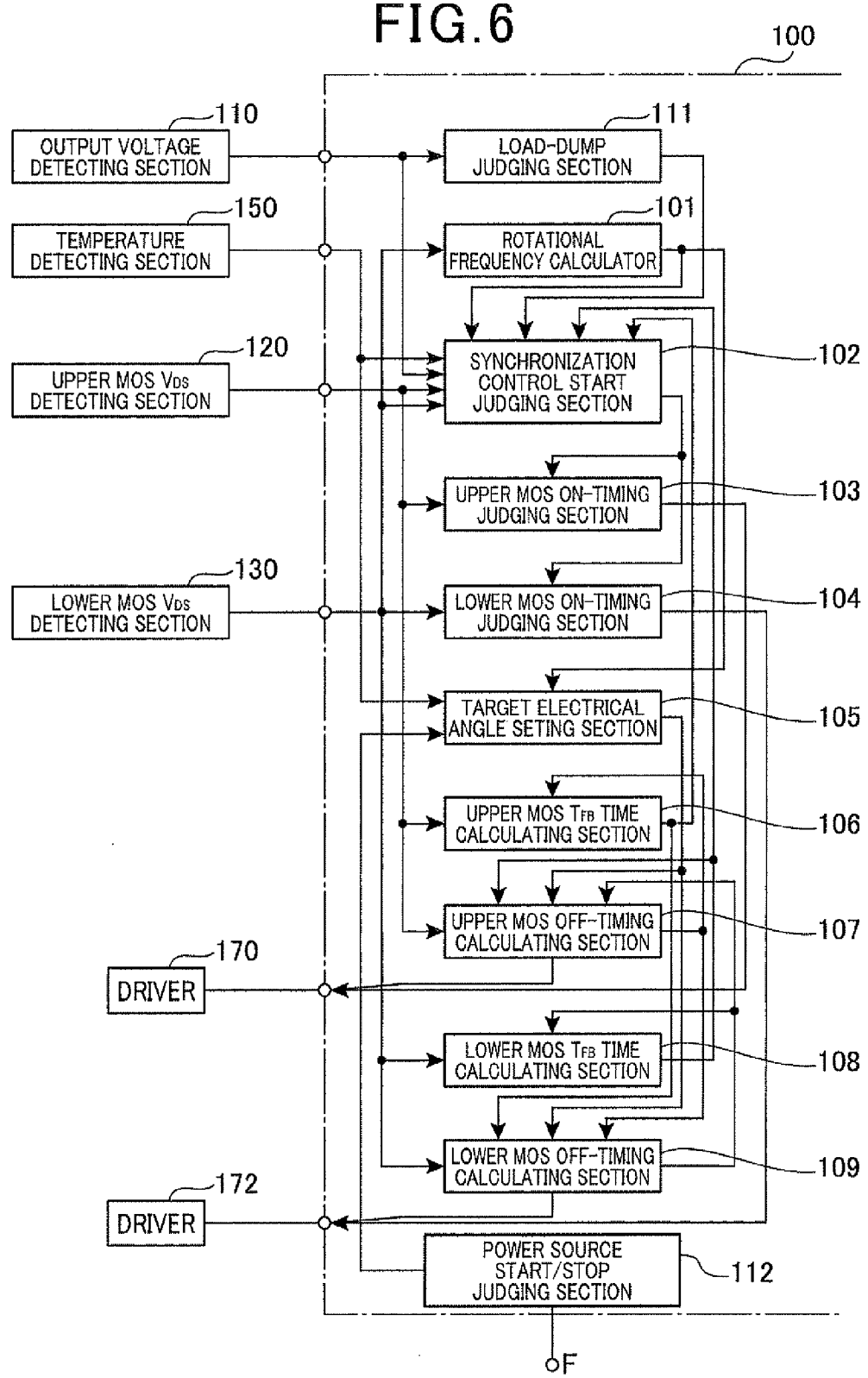
FIG. 6 is a diagram of a detailed configuration of a control section.

FIG. 6 is a diagram of a detailed configuration of the control section 100. As shown in FIG. 6, the control section 100 includes a rotation frequency calculator 101, a synchronization control start judging section 102, an upper MOS ON-timing judging section 103, a lower MOS ON-timing judging section 104, a target electrical angle setting section 105, an upper MOS·$T_{FB}$ time calculating section 106, an upper MOS OFF-timing calculating section 107, a lower MOS·$T_{FB}$ time calculating section 108, a lower MOS OFF-timing calculating section 109, a load-dump judging section 111, and a power source start/stop judging section 112. Each of the configurations above are embodied by, for example, a predetermined operation program stored in a memory or the like being loaded and run by a central processing unit (CPU) in synchronization with a clock signal generated by a clock generating circuit. Alternatively, the configurations may be configured by hardware. Specific operations of each configuration will be described hereafter.

The upper MOS ON-timing judging section 103 and the lower MOS ON-timing judging section 104 correspond with an "ON-timing setting section". The target electrical angle setting section 105, the upper MOS·$T_{FB}$ time calculating section 106, the upper MOS OFF-timing calculating section 107, the lower MOS·$T_{FB}$ time calculating section 108, and the lower MOS OFF-timing calculating section 109 correspond with an "energization period detector".

The rectifier module 5x and the like according to the present embodiment are configured as described above. Next, operations of the rectifier module 5x and the like will be described.

(1) Power Source Start/Stop Judgment

The power source start/stop judging section 112 monitors the presence of a pulse width modulated (PWM) signal (excitation current) supplied from the F terminal of the power generation control device 7 to the field winding 4. The power source start/stop judging section 112 instructs the power source 160 to start when the PWM signal is continuously outputted for 30 µsec. In addition, the power source start/stop judging section 112 instructs the power source 160 to stop when the output of the PWM signal is discontinued for one second. In this way, the rectifier module 5X and the like start operation when the supply of excitation current to the field winding 4 is started, and stops operation when the supply of excitation current is stopped. Therefore, as a result of the rectifier module 5X and the like being operated only during power generation by the vehicle power generator 1, wasteful power consumption can be suppressed.

(2) Synchronization Control Operation

Figure 7:
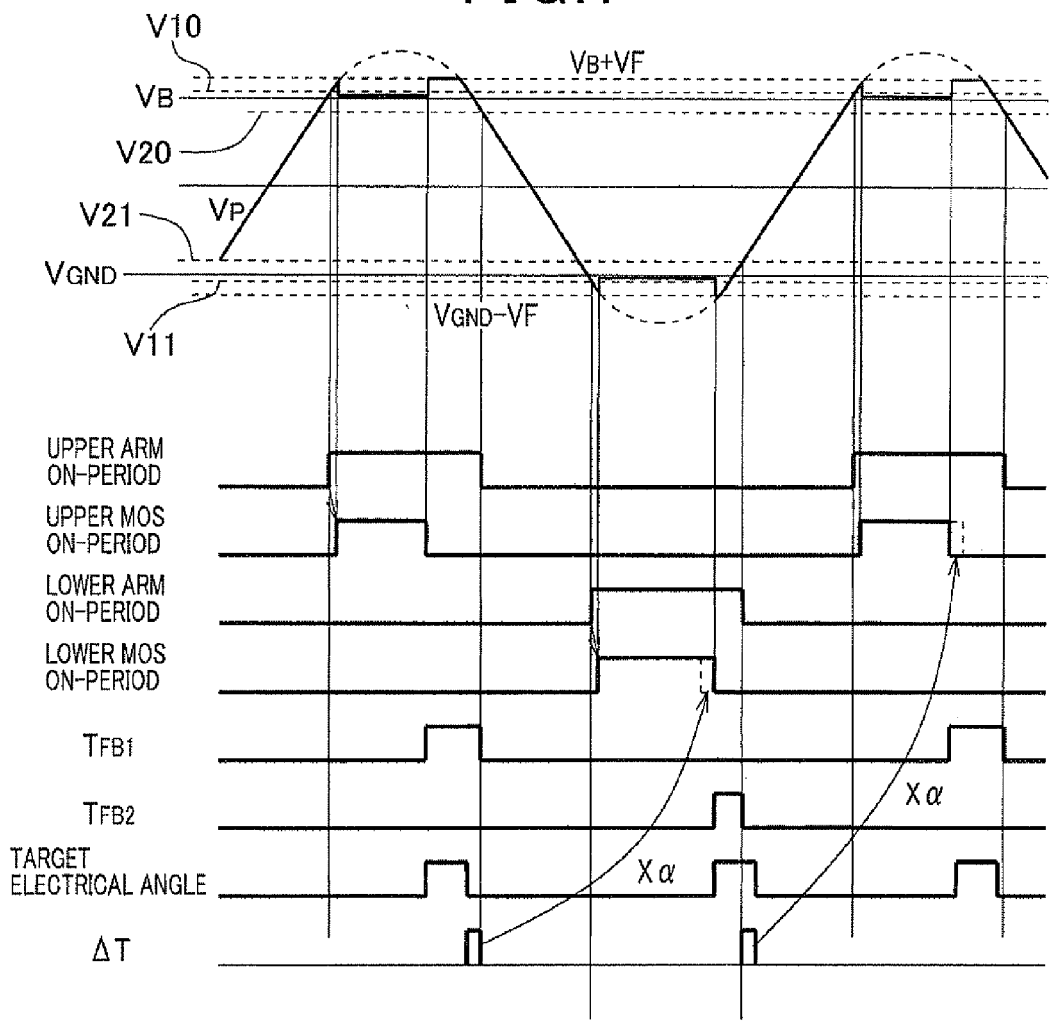
FIG. 7 is an operation timing chart for synchronization control performed by the control section.

FIG. 7 is an operation timing chart for the synchronized rectification control (synchronization control) performed by the control section 100. In FIG. 7, an "upper arm ON-period" indicates the output signal from the upper MOS $V_{DS}$ detecting section 120. An "upper MOS ON-period" indicates the ON/OFF-timings of the high-side MOS transistor 50. A "lower arm ON-period" indicates the output signal from the lower MOS $V_{DS}$ detecting section 130. A "lower MOS ON-period" indicates the ON/OFF-timings of the low-side MOS transistor 51. $T_{FB1}$, $T_{FB2}$, target electrical angle, and ΔT will be described hereafter. The synchronization control shown in FIG. 7 is performed after the synchronization control start judging section 102 judges that the timing for starting synchronization control has been reached.

The upper MOS ON-timing judging section 103 monitors the output signal from the upper MOS $V_{DS}$ detecting section 120 (upper arm ON-period). The upper MOS ON-timing judging section 103 judges the rise of the output signal from a low voltage level to a high voltage level to be the ON-timing of the high-side MOS transistor 50. The upper MOS ON-timing judging section 103 sends an instruction to the driver 170. The driver 170 turns ON the MOS transistor 50 in adherence to the instruction.

The upper MOS OFF-timing calculating section 107 judges the elapse of a predetermined amount of time after the MOS transistor 50 is turned ON to be the OFF-timing of the MOS transistor 50. The upper MOS OFF-timing calculating section 107 sends an instruction to the driver 170. The driver 170 turns OFF the MOS transistor 50 in adherence to the instruction.

The predetermined amount of time used to decide the OFF-timing is variably set each time such as to be earlier than the end point of the upper arm ON-period (the point at which the output signal from the upper MOS $V_{DS}$ detecting section 120 falls from a high voltage level to a low voltage level) by a "target electrical angle".

The target electrical angle is a margin provided such that, when an instance in which the MOS transistor 50 is normally turned OFF and rectification is performed through the diode is considered, the OFF-timing of the MOS transistor 50 is not later than the end point of the energization period in diode rectification. The target electrical angle setting section 105 sets the target electrical angle. The target electrical angle setting section 105 sets the target electrical angle based on rotation frequency calculated by the rotation frequency calculator 101. The target electrical angle is set to a large value in a low-speed rotation range and a high-speed rotation range. The target electrical angle is set to a small value in an intermediate range between the low-speed rotation range and the high-speed rotation range. The setting of the target electrical angle based on rotation frequency will be described hereafter.

In a similar manner, the lower MOS ON-timing judging section 104 monitors the output signal from the lower MOS $V_{DS}$ detecting section 130 (lower arm ON-period). The lower MOS ON-timing judging section 104 judges the rise of the output signal from a low voltage level to a high voltage level to be the ON-timing of the low-side MOS transistor 51. The lower MOS ON-timing judging section 104 sends an instruction to the driver 172. The driver 172 turns ON the MOS transistor 51 in adherence to the instruction.

The lower MOS OFF-timing calculating section 109 judges the elapse of a predetermined amount of time after the MOS transistor 51 is turned ON to be the OFF-timing of the MOS transistor 51. The lower MOS OFF-timing calculating section 109 sends an instruction to the driver 172. The driver 172 turns OFF the MOS transistor 51 in adherence to the instruction.

The predetermined amount of time used to decide the OFF-timing is variably set each time such as to be earlier than the end point of the lower arm. ON-period (the point at which the output signal from the lower MOS $V_{DS}$ detecting section 130 falls from a high voltage level to a low voltage level) by a "target electrical angle".

The target electrical angle is a margin provided such that, when an instance in which the MOS transistor 51 is normally turned OFF and rectification is performed through the diode is considered, the OFF-timing of the MOS transistor 51 is not later than the end point of the energization period in diode rectification. The target electrical angle setting section 105 sets the target electrical angle.

In actuality, the end points of the upper arm ON-period and the lower arm ON-period are unknown at the point at which the MOS transistors 50 and 51 are turned OFF. Therefore, the upper MOS OFF-timing calculating section 107 and the lower MOS OFF-timing calculating section 109 feed back information from a half-cycle earlier. As a result, the setting accuracy of the OFF-timings of the MOS transistor 50 and the MOS transistor 51 is increased.

For example, the OFF-timing of the high-side MOS transistor 50 is set as follows. The lower MOS $T_{FB}$ time calculating section 108 calculates time $T_{FB2}$ (FIG. 7), from when the low-side MOS transistor 51 is turned OFF until the end point of the lower arm ON-period, from a half-cycle earlier. The upper MOS OFF-timing calculating section 107 determines $\Delta T$ that is the time $T_{FB2}$ subtracted by the target electrical angle. When rotation and the like are stable, the time $T_{FB2}$ and the target angle become equal, and $\Delta T=0$. However, $\Delta T$ often does not become zero due to: (A) rotational fluctuations accompanying acceleration of the vehicle, (B) pulsations in the engine rotation, (C) fluctuations in the electrical load, (D) fluctuations in the operating clock cycle when the CPU runs a predetermined program and actualizes the control section 100, and (E) a turn-OFF delay between when the drivers 170 and 172 are instructed to turn OFF the MOS transistors 50 and 51 and when the MOS transistors 50 and 51 are actually turned OFF.

Therefore, the upper MOS OFF-timing calculating section 107 corrects the lower MOS ON-period used by the lower MOS OFF-timing calculating section 109 a half-cycle earlier based on $\Delta T$ and sets the upper MOS ON-period. As a result, the upper MOS OFF-timing calculating section 107 decides the OFF-timing of the MOS transistor 50. Specifically, when a correction coefficient is $\alpha$, the upper MOS ON-period is set by a following formula.

(upper MOS ON-period)=(lower MOS ON-period from half-cycle earlier)+$\Delta T \times \alpha$ In a similar manner, the OFF-timing of the low-side MOS transistor 51 is set as follows. The upper MOS $T_{FB}$ time calculating section 106 calculates time $T_{FB1}$ (FIG. 7), from when the high-side MOS transistor 51 is turned OFF until the end point of the upper arm ON-period, from a half-cycle earlier. The lower MOS OFF-timing calculating section 109 determines $\Delta T$ that is the time $T_{FB1}$ subtracted by the target electrical angle. The lower MOS OFF-timing calculating section 109 corrects the upper MOS ON-period used by the upper MOS OFF-timing calculating section 107 a half-cycle earlier based on $\Delta T$ and sets the lower MOS ON-period. As a result, the lower MOS OFF-timing calculating section 109 decides the OFF-timing of the MOS transistor 51. Specifically, when a correction coefficient is $\alpha$, the lower MOS ON-period is set by a following formula.

(lower MOS ON-period)=(upper MOS ON-period from half-cycle earlier)+$\Delta T \times \alpha$ In this way, the high-side MOS transistor 50 and the low-side MOS transistor 51 are alternately turned ON at the same cycle as when diode rectification is performed. A low-loss rectification operation using the MOS transistors 50 and 51 is performed.

(3) Method of Setting Target Electrical Angle

Next, a method of setting the target electrical angle will be described. The target electrical angle is set to a value based on the rotation frequency. A reason for this is that the value of the target electrical angle (minimum value) required to perform synchronization control such that the timings at which the MOS transistors 50 and 51 are turned OFF are not later than the end points of the upper arm ON-period and the lower arm ON-period is dependent on the rotation frequency. Specifically, the value of the required target electrical angle is changed based on the rotation frequency for the same reason $\Delta T$ does not become zero due to: (A) rotational fluctuations accompanying acceleration of the vehicle, (B) pulsations in the engine rotation, (C) fluctuations in the electrical load, (D) fluctuations in the operating clock cycle when the CPU runs a predetermined program and actualizes the control section 100, and (E) a turn-OFF delay between when the drivers 170 and 172 are instructed to turn OFF the MOS transistors 50 and 51 and when the MOS transistors 50 and 51 are actually turned OFF, as described above regarding the operation for setting the OFF-timings performed by the upper MOS OFF-timing calculating section 107 and the lower MOS OFF-timing calculating section 109.

Figure 8:
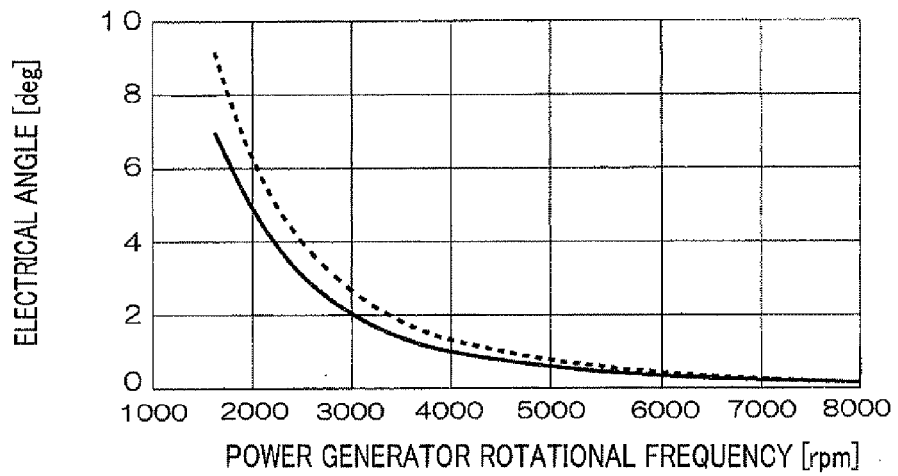
FIG. 8 is a diagram showing fluctuations in electrical angle when sudden acceleration of a vehicle is assumed.

FIG. 8 is a diagram showing the fluctuations in electrical angle when sudden acceleration of the vehicle (sudden increase in rotation frequency) is assumed (corresponding to the instance described in A, above). In FIG. 8, the horizontal axis indicates the rotation frequency of the vehicle power generator 1. The vertical axis indicates the electrical angle indicating the extent of fluctuations in the length of the upper arm ON-period and in the length of the lower arm ON-period when rotational fluctuations occur in which the rotation frequency of the vehicle power generator 1 rises from 2000 rpm to 16000 rpm in one second. The characteristics indicated by the solid line in FIG. 8 correspond to when the rotor has eight poles. The characteristics indicated by the dotted line correspond to when the rotor has six poles.

As shown in FIG. 8, the extent of ON-period fluctuations indicated by the electrical angle increases as the rotation frequency decreases. The extent of ON-period fluctuations indicated by the electrical angle decreases as the rotation frequency increases. When these characteristics are reflected, the target electrical angle is required to be set to a larger value, the further the rotation frequency is towards the low-speed rotation range. The target electrical angle is required to be set to a smaller value, the further the rotation frequency is towards the high-speed rotation range.

Figure 9:
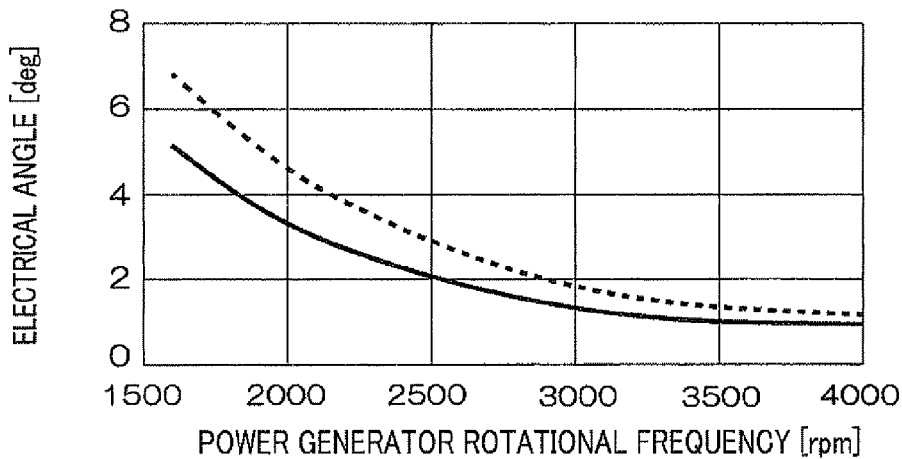
FIG. 9 is a diagram showing fluctuations in electrical angle when fluctuations in engine rotation are assumed.

FIG. 9 is a diagram showing the fluctuations in electrical angle when fluctuations in engine rotation of ±40 rpm are assumed (corresponding to the instance described in B, above). In FIG. 9, the horizontal axis indicates the rotation frequency of the vehicle power generator 1. The vertical axis indicates the electrical angle indicating the extent of fluctuations in the length of the upper arm ON-period and in the length of the lower arm ON-period when the above-described fluctuations in engine rotation occur, with a pulley ratio of 2.5. The characteristics indicated by the solid line in FIG. 9 correspond to when the rotor has eight poles. The characteristics indicated by the dotted line correspond to when the rotor has six poles.

As shown in FIG. 9, the extent of ON-period fluctuations indicated by the electrical angle increases as the rotation frequency decreases. The extent of ON-period fluctuation indicated by the electrical angle decreases as the rotation frequency increases. When these characteristics are reflected, the target electrical angle is required to be set to a larger value, the further the rotation frequency is towards the low-speed rotation range. The target electrical angle is required to be set to a smaller value, the further the rotation frequency is towards the high-speed rotation range.

Figure 10:
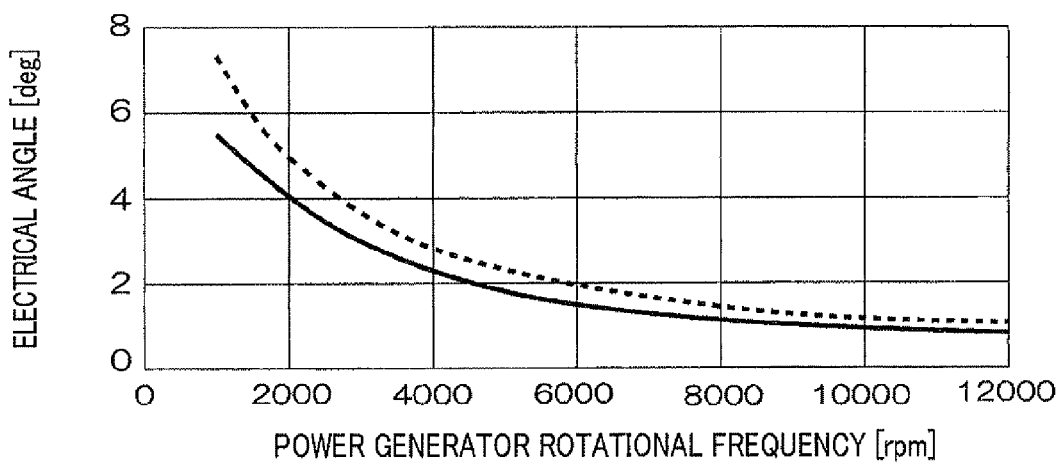
FIG. 10 is a diagram showing fluctuations in electrical angle when sudden fluctuations in electrical load are assumed.

FIG. 10 is a diagram showing the fluctuations in electrical angle when sudden fluctuations in electrical load are assumed (corresponding to the instance described in C, above). In FIG. 10, the horizontal axis indicates the rotation frequency of the vehicle power generator 1. The vertical axis indicates the electrical angle indicating the extent of fluctuations in the length of the upper arm ON-period and in the length the lower arm ON-period when an electrical load 10 of 50 A is cut off and the output voltage $V_B$ changes to 13.5V to 14.0V. The characteristics indicated by the solid line in FIG. 10 correspond to when the rotor has eight poles. The characteristics indicated by the dotted line correspond to when the rotor has six poles.

As shown in FIG. 10, the extent of ON-period fluctuations indicated by the electrical angle increases as the rotation frequency decreases. The extent of ON-period fluctuations indicated by the electrical angle decreases as the rotation frequency increases. When these characteristics are reflected, the target electrical angle is required to be set to a larger value, the further the rotation frequency is towards the low-speed rotation range. The target electrical angle is required to be set to a smaller value, the further the rotation frequency is towards the high-speed rotation range.

Figure 11:
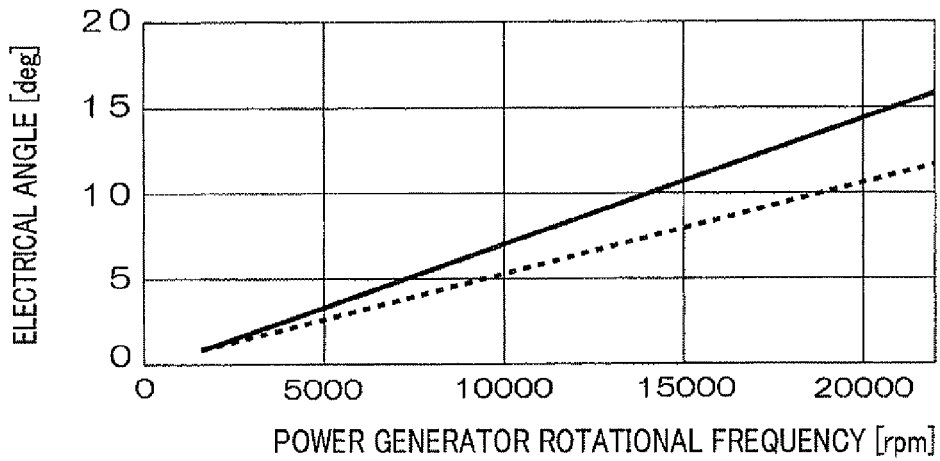
FIG. 11 is a diagram showing fluctuations in electrical angle when turn-OFF delay by a driver is assumed.

FIG. 11 is a diagram showing the fluctuations in electrical angle when a turn-OFF delay by the drivers 170 and 172 is assumed (corresponding to the instance described in E, above). In FIG. 11, the horizontal axis indicates the rotation frequency of the vehicle power generator 1. The vertical axis indicates the electrical angle indicating the extent of fluctuations in the length of the upper arm ON-period and in the length of the lower arm ON-period when a turn-OFF delay between when the drivers 170 and 172 are respectively given an instruction to turn OFF the MOS transistors 50 and 51 and when the MOS transistors 50 and 51 are actually turned OFF is 15 μsec. The characteristics indicated by the solid line in FIG. 11 correspond to when the rotor has eight poles. The characteristics indicated by the dotted line correspond to when the rotor has six poles.

As shown in FIG. 11, the extent of ON-period fluctuations indicated by the electrical angle decreases as the rotation frequency decreases. The extent of ON-period fluctuations indicated by the electrical angle increases as the rotation frequency increases. When these characteristics are reflected, the target electrical angle is required to be set to a smaller value, the further the rotation frequency is towards the low-speed rotation range. The target electrical angle is required to be set to a larger value, the further the rotation frequency is towards the high-speed rotation range.

In addition to those described above, fluctuations in the clock cycle are also required to be taken into consideration (corresponding to the instance described in D, above). For example, when a 2 MHz system clock is used and its accuracy is ±β%, or in other words, fluctuations of β% occur, the fluctuations in the length of the upper arm ON-period and in the length of the lower arm ON-period increase, the further the rotation frequency is towards the high-speed rotation range. The fluctuations decrease, the further the rotation frequency is towards the low-speed rotation range. A reason for this is that, although the accuracy of the clock is constant regardless of the rotation frequency, the amount of time equivalent to a single electrical angle cycle of the phase voltage $V_P$ becomes shorter, the further the rotation frequency is towards the high-speed rotation range. Therefore, the relative proportion of the clock fluctuation during the ON period increases. When these characteristics are reflected, the target electrical angle is required to be set to a smaller value, the further the rotation frequency is towards the low-speed rotation range. The target electrical angle is required to be set to a larger value, the further the rotation frequency is towards the high-speed rotation range.

Figure 12:
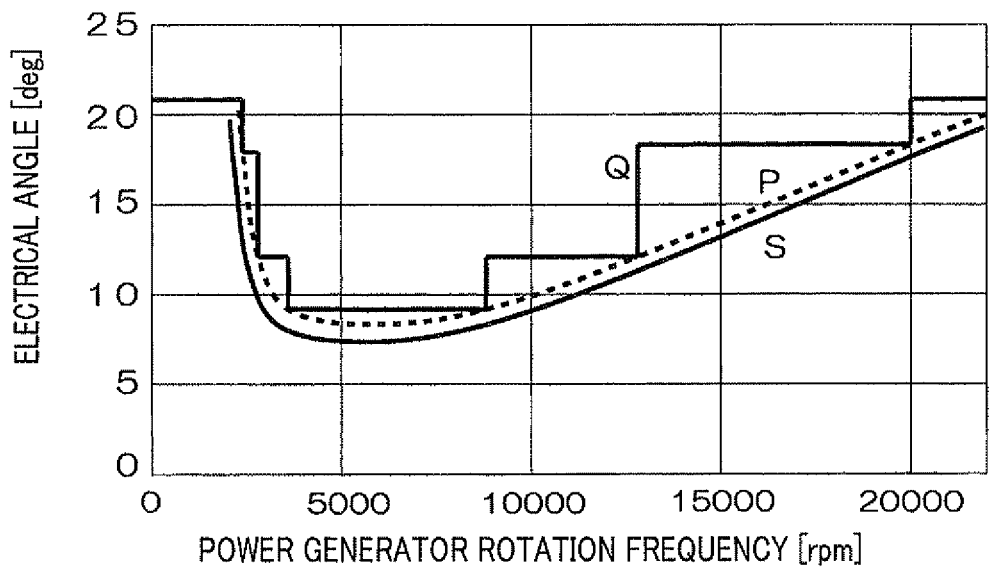
FIG. 12 is a diagram showing fluctuations in electrical angle when a combination of various factors is assumed.

FIG. 12 is a diagram showing the fluctuations in electrical angle when a combination of the various factors corresponding to the instances in A to E, described above, is assumed. In FIG. 12, the horizontal axis indicates the rotation frequency of the vehicle power generator 1. The vertical axis indicates a cumulative value of electrical angle fluctuations corresponding to the various factors. The characteristics S in FIG. 12 indicate the cumulative value of electrical angle fluctuations when the rotor has eight poles.

As shown in FIG. 12, when the various factors corresponding to the instances in A to E are combined, the extent of electrical angle fluctuations increases, the further the rotation frequency is towards the high-speed rotation range and the low-speed rotation range. In an intermediate-speed rotation range, the extent of electrical angle fluctuations decreases. The target electrical angle setting section 105 reflects these characteristics. In other words, the target electrical angle setting section 105 sets the target electrical angle to a larger value in the low-speed rotation range and the high-speed rotation range. The target electrical angle setting section 105 sets the target electrical angle to a smaller value in the intermediate-speed rotation range. The two types of characteristics indicated by P and Q in FIG. 12 indicate the target electrical angles set in this way. One of the target electrical angles indicated by P is that in which the value continuously changes based on the rotation frequency. In this instance, the minimum value of the target electrical angle can be set based on the rotation frequency. The other of the target electrical angles indicated by Q is that in which the value changes in steps based on the rotation frequency. In this instance, for example, a plurality of values that change based on the rotation frequency are merely required to be stored in table format. Therefore, the configuration required for variably setting the target electrical angle can be simplified.

(4) Specific Example of Rotation Frequency Calculation

Next, a specific example of the rotation frequency calculation performed by the rotation frequency calculator 101 will be described. The rotation frequency calculator 101 monitors the output signal from the lower MOS $V_{DS}$ detecting section 130, and calculates the rotation frequency based on the cycle of a start timing of the lower MOS ON-period. The start timing of the lower MOS ON-period is also the ON-timing of the low-side MOS transistor 51. Therefore, the rotation frequency calculator 10 can also be said to calculate the rotation frequency based on the interval of the ON-timing of the low-side MOS transistor 51.

Figure 13:
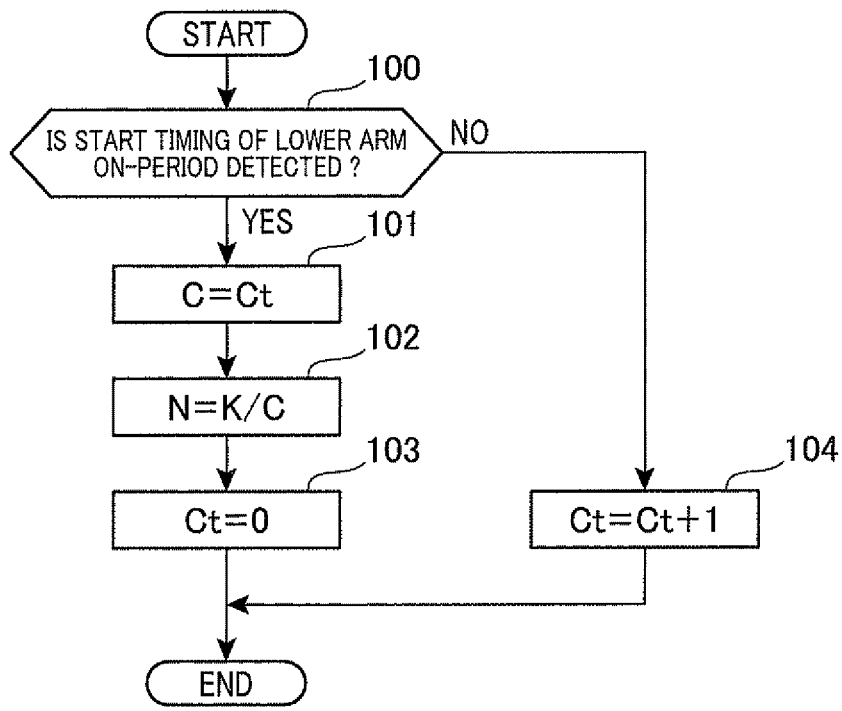
FIG. 13 is a flowchart of operation procedures for rotation frequency calculation performed by a rotation frequency calculator.

FIG. 13 is a flowchart of the operation procedures for rotation frequency calculation performed by the rotation frequency calculator 101. The operation procedures shown in FIG. 13 are repeated at a predetermined cycle sufficiently shorter than the cycle at which the lower arm ON-period is repeated (cycle of the phase voltage).

The rotation frequency calculator 101 monitors the output signal from the lower MOS $V_{DS}$ detecting section 130. The rotation frequency calculator 101 judges whether or not the output signal has risen from a low voltage level to a high voltage level and the start timing of the lower arm ON-period has been detected (whether or not the ON-timing of the low-side MOS transistor 51 has been reached) (Step 100). When the start timing of the lower arm ON-period is detected, the rotation frequency calculator 101 judges YES. Next, the rotation frequency calculator 101 holds the value of a cycle counter Ct at the present point as a cycle C (Step 101). Here, the value of the cycle counter Ct is reset with the start timing of the lower arm ON-period. The value increases by one every time the operation procedures shown in FIG. 13 are performed once. At the start timing of the next lower arm ON-period, the value that has increased up to this point is read out. Therefore, "holds the value of a cycle counter Ct at the present point as a cycle C" at Step 101 refers to reading out the value of the cycle counter Ct that has increased up to the present point at the start timing of the next lower arm ON-period.

Next, the rotation frequency calculator 101 calculates a rotation frequency N of the vehicle power generator 1 using the following formula (Step 102).

$$N=K/C,$$

in which, K represents a coefficient for converting the cycle Ct to a rotation frequency, and has a value that is decided based on the time interval at which the value of the cycle counter Ct increases (the time interval at which the operation procedures in FIG. 13 are performed) and the like.

Next, the rotation frequency calculator 101 resets the cycle counter Ct to zero (Step 103) and completes the series of operations related to rotation frequency calculation. On the other hand, when the start timing of the lower arm ON-period is not detected, the rotation frequency calculator 101 judges NO at Step 100. The rotation frequency calculator 101 updates the value of the cycle counter Ct by adding one (Step 104) and completes the series of operations related to rotation frequency calculation. The updating of the value of the cycle counter Ct is repeated at a predetermined cycle until the value of the cycle counter Ct is reset at Step 103.

As described above, in the vehicle power generator 1 according to the present embodiment, one end side (source) of the low-side MOS transistor 51 is connected to the negative terminal of the battery 9 via the vehicle body (grounding). Therefore, even when sudden fluctuations in electrical load 10 occurs, the fluctuations in power generation voltage (phase voltage) are small. The accuracy of rotation frequency calculation can be improved through use of the lower MOS ON-period (specifically, the cycle of the start timing) detected based on the power generation voltage.

In addition, the first threshold value used to set the ON-timing of the low-side MOS transistor 51 is also used in rotation frequency calculation. Therefore, the lower MOS $V_{DS}$ detecting section 130 that performs the comparison operation between the phase voltage and the first threshold value voltage can be commonly used. Processes and configurations can be simplified.

In addition, the upper MOS OFF-timing calculating section 107 and the lower MOS OFF-timing calculating section 109 set the OFF-timings of the MOS transistor 50 and the MOS transistor 51 based on the rotation frequency calculated by the rotation frequency calculator 101. Therefore, synchronization control for turning ON/OFF the MOS transistors 50 and 51 can be performed with a simple configuration, without use of a separate component, such as a sensor, for detecting the rotation frequency.

According to the above-described embodiment, the timing at which the rotation frequency calculated using the rotation frequency calculator 101 is reflected in the OFF-timing settings of the MOS transistors 50 and 51 is not described. The OFF-timings are preferably set using the newest rotation frequency information. In other words, the OFF-timing of each MOS transistor 50 and 51 included in the subsequent cycle of the phase voltage is preferably set based on the rotation frequency calculated by the rotation frequency calculator 101. As a result, highly accurate OFF-control of the MOS transistors 50 and 51 can be performed using the newest rotation frequency.

According to the above-described embodiment, the value of the target electrical angle is variably set based on the rotation frequency. However, the value of the target electrical angle may also be set by combining temperature and output current with the rotation frequency.

For example, in general, the fluctuations in the cycle of a clock generated by a clock generator increases as the temperature rises. When an instance in which the clock generator is included within the rectifier module 5X and the like is considered, the temperature detected by the temperature detecting section 150 can be considered to match the temperature of the clock generator. The target electrical angle setting section 105 sets the target electrical angle to a larger value when the temperature detected by the temperature detecting section 150 is high and the target electrical angle is increasing in relation to the rotation frequency. The target electrical angle setting section 105 sets the target electrical angle to a smaller value, the lower the temperature is. As a result of effects attributed to temperature being considered, the target electrical angle can be further set to an appropriate value. Further loss reduction and improvement in power generation efficiency can be achieved.

In general, the larger the output current, the steeper the rise and drop in phase voltage $V_P$ is. Conversely, the smaller the output current, the more gradual the rise and drop in phase voltage $V_P$ is. As described above, the point at which the upper arm ON-period ends and the timing at which the current flowing to the diode connected in parallel with the MOS transistor 50 actually stops are shifted. The extent of shifting becomes more noticeable during small output in which the change in phase voltage $V_P$ is gradual. The target electrical angle setting section 105 sets the target electrical angle to a larger value, the smaller the output current is. The target electrical angle setting section 105 sets the target electrical angle to a smaller value, the larger the output current is. As a result of the effects attributed to changes in output current being considered, the target electrical angle can be further set to an appropriate value. Further loss reduction and improvement in power generation efficiency can be achieved. The size of the output current can be judged by the ON-duty of the PWM signal supplied from the F terminal of the power generation control device 7 to the field winding 4 being monitored. Alternatively, the size of the output current may be judged by, for example, a current detection resistor being inserted between the source of the MOS transistor 51 shown in FIG. 2 and the negative terminal (grounding) of the battery 9. The judgment is made based on both end voltages of the current detection resistor.

Figure 14:
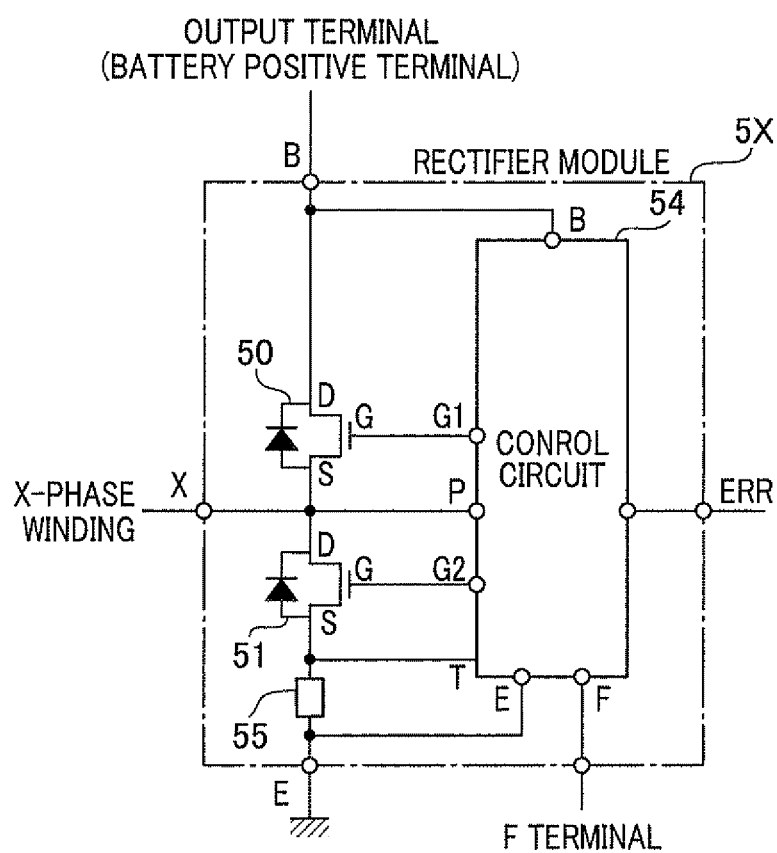
FIG. 14 is a diagram of a variation example of the rectifier module.
Figure 15:
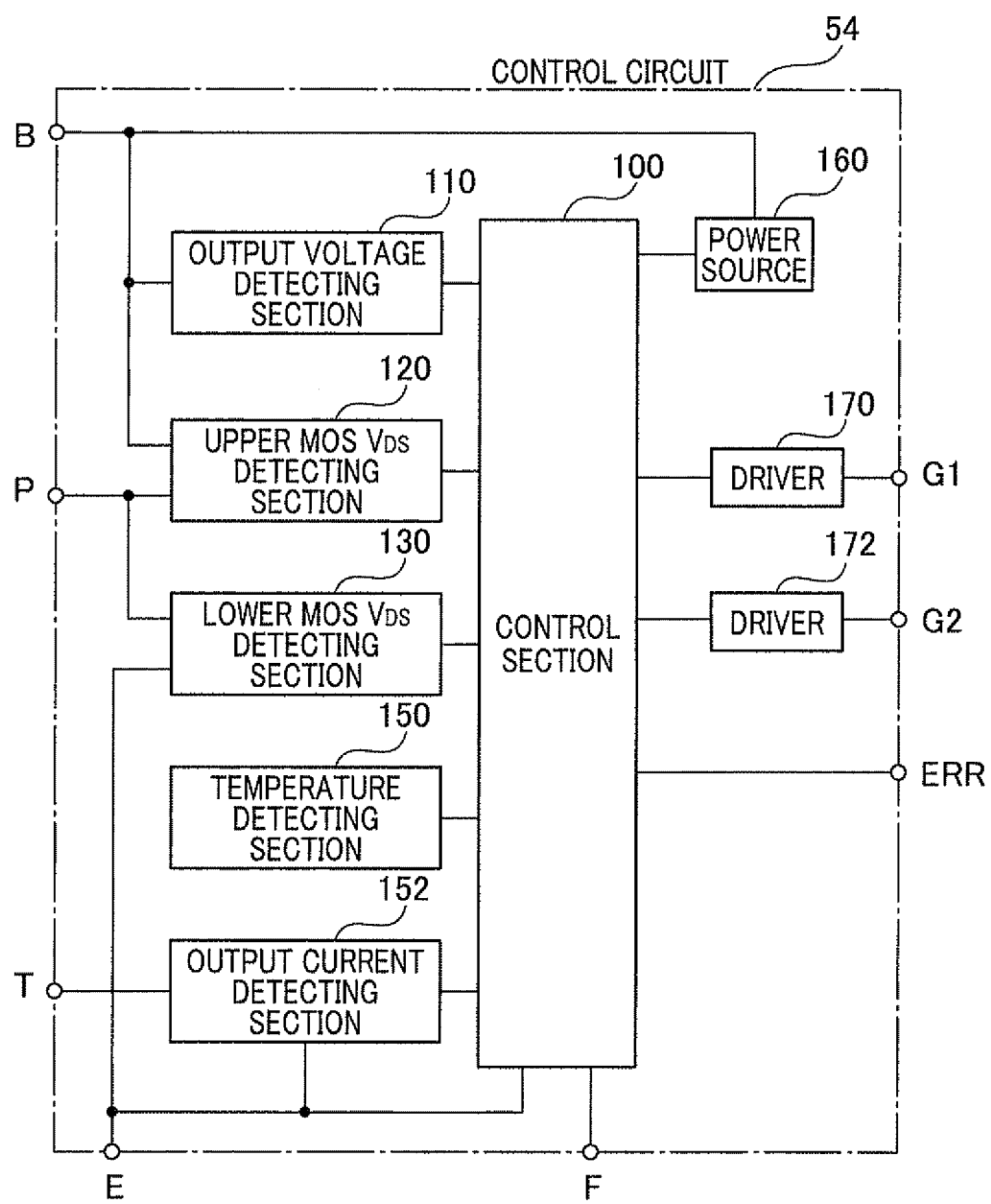
FIG. 15 is a diagram of a variation example of a control circuit.

FIG. 14 and FIG. 15 are diagrams of the configurations of a variation example in which a current detecting section is added and the size of the output current is judged. The configuration shown in FIG. 14 is the rectifier module 5X shown in FIG. 2 to which a current detection resistor 55 has been added. The configuration shown in FIG. 15 is the control circuit 54 shown in FIG. 3 to which an output current detecting section 152 has been added. The output current detecting section 152 detects the output current based on both end voltages of the current detection resistor 55. In this instance, the size of the output current is judged based on the current value of the current flowing through the MOS transistor 51 of the rectifier module 5X. However, instead, the size of the output current may be judged by the current value of the current flowing through the charging line 12 or the output terminal being directly detected using a current sensor.

The present invention is not limited to the above-described embodiment. Various modifications can be made without departing from the spirit of the present invention. For example, according to the above-described embodiment, the rotation frequency is calculated based on the cycle of the start timing of the lower MOS ON-period. However, the rotation frequency can be calculated based on the cycle of the end timing of the lower MOS ON-period.

Figure 16:
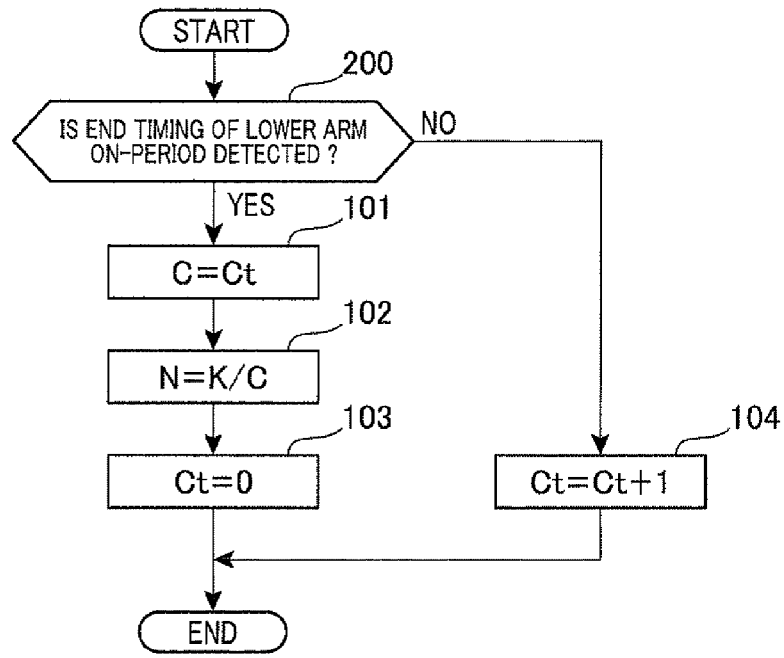
FIG. 16 is a flowchart of a variation example of the operation procedures for rotation frequency calculation performed by the rotation frequency calculator.

FIG. 16 is a flowchart of a variation example of the operation procedures for rotation frequency calculation performed by the rotation frequency calculator 101. The operation procedures shown in FIG. 16 differ from the operation procedures shown in FIG. 13 in that the operation at Step 100 is replaced with the operation at Step 200. At Step 200, the rotation frequency calculator 101 monitors the output signal from the lower MOS $V_{DS}$ detecting section 130. The rotation frequency calculator 101 judges whether or not the output signal has dropped from a high voltage level to a low voltage level, and an end timing of the lower arm ON-period has been detected. The operations at the other steps are the same as those shown in FIG. 13. The value of the cycle counter Ct is reset at the end timing of the lower arm ON-period. The value is increased by one every time the operation procedures in FIG. 16 are performed once. The value that has increased up to the present point is read out at the end timing of the next lower arm ON-period.

In addition, the rotation frequency may be calculated using the cycles of both the start timing and the end timing of the lower MOS ON-period.

Figure 17:
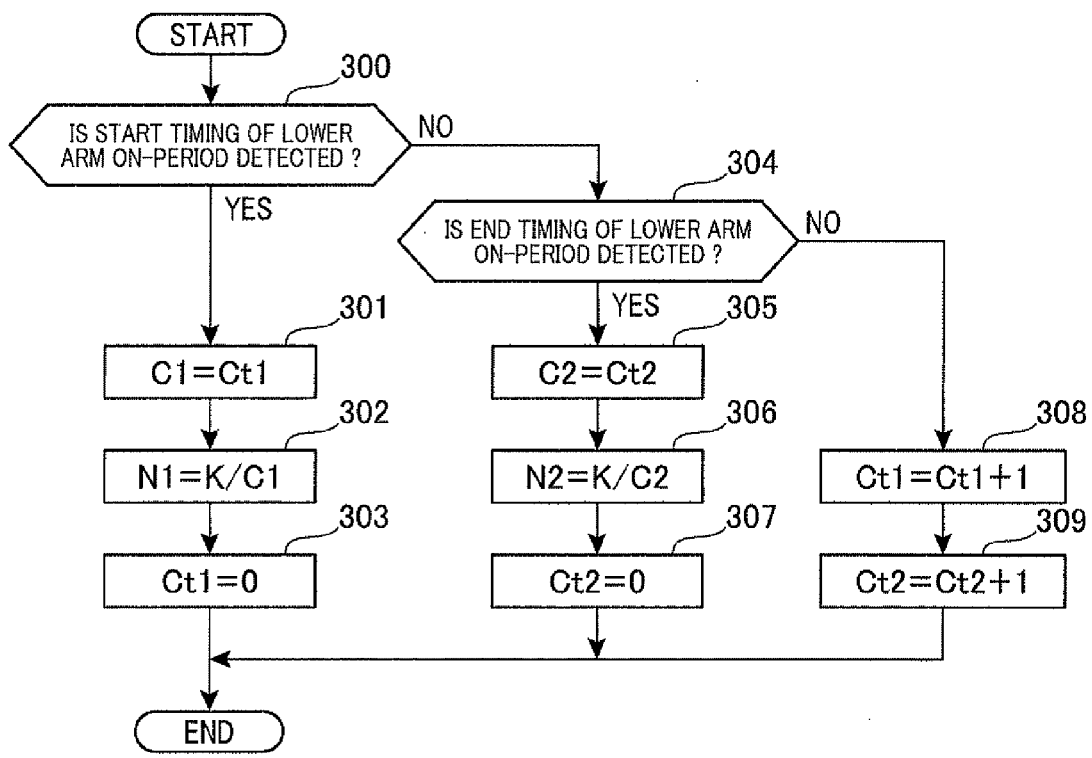
FIG. 17 is a flowchart of another variation example of the operation procedures for rotation frequency calculation performed by the rotation frequency calculator.

FIG. 17 is a flowchart of another variation example of the operation procedures for rotation frequency calculation performed by the rotation frequency calculator 101. In the operation procedures shown in FIG. 17, a rotation frequency N1 is calculated based on the cycle of the start timing of the lower MOS ON-period and a rotation frequency N2 is calculated based on the cycle of the end timing, through combination of the operation procedures in FIG. 13 and the operation procedures in FIG. 16.

The rotation frequency calculator 101 monitors the output signal from the lower MOS $V_{DS}$ detecting section 130. The rotation frequency calculator 101 judges whether or not the start timing of the lower arm ON-period has been detected (Step 300). The rotation frequency calculator 101 also judges whether or not the end timing has been detected (Step 304). When the start timing of the lower arm ON-period is detected, the rotation frequency calculator 101 judges YES at Step 300. Next, the rotation frequency calculator 101 holds the value of a cycle counter CU at this point as a cycle C1 (Step 301) and calculates the rotation frequency N1 of the vehicle power generator 1 using the following formula (Step 302).

$$N1=K/C1$$

Next, the rotation frequency calculator 101 resets the cycle counter Ct1 to zero (step 303) and completes the series of operations related to rotation frequency calculation.

In addition, when the end timing of the lower arm ON-period is detected, the rotation frequency calculator 101 judges Yes at Step 304. Next, the rotation frequency calculator 101 holds the value of a cycle counter Ct2 at this point as a cycle C2 (Step 305) and calculates the rotation frequency N2 of the vehicle power generator 1 using the following formula (Step 306).

$$N2=K/C2$$

Next, the rotation frequency calculator 101 resets the cycle counter Ct2 to zero (step 307) and completes the series of operations related to rotation frequency calculation.

When neither the start timing nor the end timing, of the lower arm ON-period is detected, the rotation frequency calculator 101 judges NO at both Step 300 and Step 304. The rotation frequency calculator 101 updates the values of the two cycle counters Ct1 and Ct2 by adding one (Step 308 and Step 309) and completes the series of operations related to rotation frequency calculation. The updating of the value of the cycle counter Ct1 is repeatedly performed at a predetermined cycle until the value of the cycle counter Ct1 is reset at Step 303. The updating of the value of the cycle counter Ct3 is repeatedly performed at a predetermined cycle until the value of the cycle counter Ct2 is reset at Step 307.

In this way, the two types of rotation frequencies N1 and N2 can be obtained. For example, the OFF-timing setting of the low-side MOS transistor 51 immediately thereafter is performed using one rotation frequency N1. The OFF-timing setting of the high-side MOS transistor 50 is performed using the other rotation frequency N2. As a result, OFF-control using the newest rotation frequencies can be performed for the high-side MOS transistor 50, as well as for the low-side MOS transistor 51.

According to the above-described embodiment, the rotation frequency is calculated by a single cycle of the start timing (or the end timing) of the lower MOS ON-period being measured. However, the rotation frequency can be determined by a plurality of cycles being averaged. For example, with reference to the operation procedures in FIG. 13, using the cycle C held at Step 101 taken over a plurality of cycles and averaging the cycles C can be considered. Alternatively, using the rotation frequency N calculated at Step 102 taken over a plurality of cycles and averaging the rotation frequencies N can be considered. As a result, the rotation frequency can be stably set even when rotational fluctuations occur.

In the descriptions referencing FIG. 13, FIG. 16, and FIG. 17, the values of the cycle counters Ct, Ct1, and Ct2 are increased by one every time the operation procedures shown in the drawings are repeated at a predetermined cycle. However, the operation may be actualized using a counter configured by hardware. In this instance, the counter is counted upwards in synchronization with a predetermined clock signal. When the start timing and the end timing of the lower MOS ON-period are detected, the counter value can be read out and the counter can be reset.

According to the above-described embodiment, rotation frequency calculation is performed based on at least one of the cycle of the start timing and the cycle of the end timing of the lower MOS ON-period. However, rotation frequency calculation may be performed based on the cycle of a timing related to the lower MOS ON-period other than the start timing and the end timing. For example, rotation frequency calculation may be performed based on a cycle of a point at which a predetermined amount of time has elapsed form the start timing of the lower MOS ON-period. In this instance as well, in a manner similar to that when the cycle of the start timing or the cycle of the end timing is used, the accuracy of rotation frequency calculation can be improved.

According to the above-described embodiment, at Step 102 in FIG. 13, at Step 102 in FIG. 16, and at Step 302 and Step 306 in FIG. 17, the rotation frequency calculator 101 determines the rotation frequency using a predetermined formula (such as N=K/C). However, the relationship between the cycle C and the rotation frequency N can be held in map format or table format. When the cycle C is obtained, the corresponding rotation frequency N can be determined by referencing the map or table.

According to the above-described embodiment, the target electrical angle setting section 105 may increase the value of the target electrical angle when the frequency of instances in which the timings at which the MOS transistors 50 and 51 are turned OFF are later than the timing at which the energization period (upper arm ON-period and lower arm ON-period) ends increases. As a result, even when a state in which the timings at which the MOS transistors 50 and 51 are turned OFF are later than the energization period frequently occurs for whatever reason, control can be changed such that the MOS transistors 50 and 51 are turned OFF before the energization period ends.

According to the above-described embodiment, an instance in which the target electrical angle is set to a larger value in the low-speed rotation range and the high-speed rotation range, and to a smaller value in the intermediate-speed rotation range is described. However, the target electrical angle may be variably set with focus on the relationship between the low-speed rotation range and the high-speed rotation range, or with focus on the relationship between the intermediate-speed rotation range and the high-speed rotation range.

Specifically, when the rotation frequency is divided into the low-speed rotation range, the intermediate-speed rotation range, and the high-speed rotation range, the target electrical angle setting section 105 sets the target electrical angle to a larger value when the rotation frequency calculated by the rotation frequency calculator 101 is in the low-speed rotation range. The target electrical angle setting section 105 sets the target electrical angle to a smaller value when the rotation frequency is in the intermediate-speed rotation range. As a result, the appropriate value of the target electrical angle can be set for each rotation frequency in the range up to the intermediate-speed rotation range. Loss reduction and improvement in power generation efficiency can be achieved in the range up to the intermediate-speed rotation range. In this instance, the target electrical angle in the high-speed rotation range may be increased with the increase in rotation frequency, in a manner similar to that according to the above-described embodiment (FIG. 12). Alternatively, the target electrical angle may be held constant.

Alternatively, when the rotation frequency is divided into the low-speed rotation range, the intermediate-speed rotation range, and the high-speed rotation range, the target electrical angle setting section 105 preferably sets the target electrical angle to a larger value when the rotation frequency calculated by the rotation frequency calculator 101 is in the high-speed rotation range. The target electrical angle setting section 105 preferably sets the target electrical angle to a smaller value when the rotation frequency is in the intermediate-speed rotation range. As a result, the appropriate value of the target electrical angle can be set for each rotation frequency in the range from intermediate-speed rotation range and higher. Loss reduction and improvement in power generation efficiency can be achieved in the range from the intermediate-speed rotation range and higher. In this instance, the target electrical angle in the low-speed rotation range may be increased with the decrease in rotation frequency, in a manner similar to that according to the above-described embodiment (FIG. 12). Alternatively, the target electrical angle may be held constant.

According to the above-described embodiment, two stator windings 2 and 3, and two rectifier module groups 5 and 6 are included. However, the present invention can be applied to a vehicle power generator including one stator winding 2 and one rectifier module group 5.

According to the above-described embodiment, an instance in which the rectification operation (power generation operation) is performed using each rectifier module 5X and the like is described. However, the present invention can be applied to an rotary electric machine for a vehicle that performs motor operation by converting a direct current applied from the battery 9 to an alternating current and supplying the alternating current to the stator windings 2 and 3, by changing the ON/OFF timings of the MOS transistors 50 and 51.

According to the above-described embodiment, the two rectifier module groups 5 and 6 each include three rectifier modules. However, the number of rectifier modules may be other than three.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

INDUSTRIAL APPLICABILITY

As described above, the present invention is capable of securing a period in which current flows to the diode after the MOS transistors 50 and 51 are turned OFF and shortening this period, by variably setting the value of the target electrical angle based on the rotation frequency. Therefore, loss occurring as a result of diode rectification can be reduced, and power generation efficiency can be improved.

What is claimed is:
1. A rotary electric machine for a vehicle comprising:
an armature winding having phase windings of two phases or more;
a switching section that includes a bridge circuit having a plurality of upper arms and a plurality of lower arms configured by switching elements to each of which a diode is connected in parallel, in which one end of the switching element of each of the upper arms is connected to a positive terminal side of a battery and one end of the switching element of each of the lower arms is connected to a negative terminal side of the battery via a vehicle body, wherein the switching section rectifies an induced phase voltage of the armature winding;

an ON-timing setting section that sets an ON-timing of the switching elements;

an OFF-timing setting section that sets an OFF-timing of the switching elements;

an energization period detector that detects an energization period in which current flows to the diode connected in parallel to the switching element, when the switching element of each of the lower arms is OFF, the energization period being a period from a time when the phase voltage reaches, from a first threshold value, a second threshold; and a rotation frequency calculator that calculates a rotation frequency based on the energization period detected by the energization period detector, wherein the rotation frequency calculator is configured to calculate the rotation frequency at intervals, and the OFF-timing setting section is configured to set the OFF-timing for the switching elements of each of the upper and lower arms based on the newest rotation frequency calculated by the rotation frequency calculator, the OFF-timing to be set being present of one cycle of the phase voltage.

2. The rotary electric machine of claim 1, wherein the rotation frequency calculator is configured to calculate the rotation frequency based on at least one of a cycle of start timings of the energization period and a cycle of end timings of the energization period.

3. The rotary electric machine of claim 2, wherein the ON-timing setting section is configured to set, as the ON-timing for the switching elements of the lower arm, a timing when the phase voltage reaches the first threshold value.

4. The rotary electric machine of claim 3, wherein the rotation frequency calculator is configured to calculate a first rotation frequency based on a cycle of start timings of the energization period and a second rotation frequency based on a cycle of end timings of the energization period, and the OFF-timing setting section is configured to set the OFF-timing for the switching elements of the lower arm based on the first rotation frequency and set the OFF-timing for the switching elements of the upper arm based on the second rotation frequency.

5. The rotary electric machine of claim 4, wherein the rotation frequency calculator is configured to calculate the rotation frequency averaged over a plurality of cycles of at least one of a start timing of the energization period and an end timing of the energization period.

6. The rotary electric machine of claim 5, wherein the rotation frequency calculator is configured to calculate the rotation frequency based on a formula of K/C, wherein C denotes a measured result of at least one of a start timing of the energization period and an end timing of the energization period and K denotes a coefficient for converting the cycle into the rotation frequency.

7. The rotary electric machine of claim 1, wherein the ON-timing setting section is configured to set, as the ON-timing for the switching elements of the lower arm, a timing when the phase voltage reaches the first threshold value.

8. The rotary electric machine of claim 1, wherein the rotation frequency calculator is configured to calculate a first rotation frequency based on a cycle of start timings of the energization period and a second rotation frequency based on a cycle of end timings of the energization period, and the OFF-timing setting section is configured to set the OFF-timing for the switching elements of the lower arm based on the first rotation frequency and set the OFF-timing for the switching elements of the upper arm based on the second rotation frequency.

9. The rotary electric machine of claim 1, wherein the rotation frequency calculator is configured to calculate the rotation frequency averaged over a plurality of cycles of at least one of a start timing of the energization period and an end timing of the energization period.

10. The rotary electric machine of claim 1, wherein the rotation frequency calculator is configured to calculate the rotation frequency based on a formula of K/C, wherein C denotes a measured result of at least one of a start timing of the energization period and an end timing of the energization period and K denotes a coefficient for converting the cycle into the rotation frequency.

* * * * *

UNITED STATES PATENT AND TRADEMARK OFFICE
CERTIFICATE OF CORRECTION

PATENT NO. : 8,716,966 B2
APPLICATION NO. : 13/269168
DATED : May 6, 2014
INVENTOR(S) : Hideaki Nakayama et al.

It is certified that error appears in the above-identified patent and that said Letters Patent is hereby corrected as shown below:

In the Claims

Claim 1, Column 19, line 29, "being present of one cycle of" should read --being present in one cycle of--

Signed and Sealed this
Twenty-eighth Day of October, 2014

Michelle K. Lee
*Deputy Director of the United States Patent and Trademark Office*